United States Patent [19]
Nobe et al.

[11] Patent Number: 5,365,448
[45] Date of Patent: Nov. 15, 1994

[54] ON-VEHICLE NAVIGATION APPARATUS WITH AUTOMATIC RE-INITIALIZATION FUNCTION

[75] Inventors: Kenichi Nobe; Morio Araki, both of Kawagoe, Japan

[73] Assignee: Pioneer Electronic Corporation, Tokyo, Japan

[21] Appl. No.: 858,645

[22] Filed: Mar. 27, 1992

[30] Foreign Application Priority Data

Apr. 12, 1991 [JP] Japan ................................. 3-079881

[51] Int. Cl.$^5$ ............................................. G06F 15/50
[52] U.S. Cl. ................... 364/449; 364/444; 340/988
[58] Field of Search ............ 364/443, 444, 561, 449, 364/450, 424.01; 340/988, 995

[56] References Cited

U.S. PATENT DOCUMENTS

| | | | |
|---|---|---|---|
| 4,053,749 | 10/1977 | Shinoda et al. | 364/444 |
| 4,382,178 | 5/1983 | Mori | 364/444 X |
| 4,403,291 | 9/1983 | Von Tomkewitsch | 364/444 X |
| 5,031,104 | 7/1991 | Ikeda et al. | 364/449 |
| 5,067,081 | 11/1991 | Person | 364/444 |
| 5,093,669 | 5/1992 | Kajiyama | 340/995 X |
| 5,142,207 | 8/1992 | Song | 318/615 |
| 5,268,844 | 12/1993 | Carver et al. | 364/443 |

FOREIGN PATENT DOCUMENTS

62-140013 6/1987 Japan .
63-12096 1/1988 Japan .
63-115004 5/1988 Japan .

*Primary Examiner*—Thomas G. Black
*Assistant Examiner*—Collin W. Park
*Attorney, Agent, or Firm*—Sughrue, Mion, Zinn, Macpeak & Seas

[57] ABSTRACT

An on-vehicle navigation apparatus in which destination coordinate data stored in a memory is erased when the distance from the present location to a destination is equal to or smaller than a predetermined value at the time the engine of a vehicle is started. The destination coordinate data will not therefore be erased while the vehicle is actually running toward the destination. The arrangement prevents display of navigation information such as the direction and distance from being stopped before the vehicle arrives at the destination.

5 Claims, 4 Drawing Sheets

ON-VEHICLE NAVIGATION APPARATUS WITH AUTOMATIC RE-INITIALIZATION FUNCTION

BACKGROUND OF THE INVENTION

1. Field of the Invention

The present invention relates to an on-vehicle navigation apparatus which displays navigation information, such as the distance and direction from the present location of a vehicle to a destination.

2. Description of the Related Art

There is an on-vehicle navigation apparatus known which has map information including road data acquired by digitization of individual points on roads or streets on a map stored in a storage medium such as a CD-ROM, reads from the storage medium a group of map data of a certain area containing the present location of a vehicle, while tracking the present location, and shows the data as a map around the present vehicle location on a display as well as automatically displays the present vehicle location on the map. This the of prior art is disclosed in, for example, Japanese Provisional Patent Publication No. 63-12096.

This on-vehicle navigation apparatus computes the direction and distance from the present location to the destination to be reached, on the basis of the outputs of sensors such as a direction sensor and distance sensor to display the information on a display. The destination data is input by a user such as the driver operating keys to be stored as destination coordinate data in a memory. As long as this destination coordinate data is present in the memory, the direction and distance from the present location to the destination can be computed in accordance with the destination coordinate data and displayed on the display. Therefore, when the vehicle starts traveling toward a new destination after arriving at the destination indicated by the data stored in the memory, unless the destination coordinate data was erased from the memory, the direction and distance to the previous destination would be computed. This requires a troublesome operation for the user to perform a key operation to erase the destination coordinate data from the memory. As a solution to this problem, there has been proposed an apparatus designed such that when the distance from the present location to the destination becomes equal to or smaller than a predetermined value while the vehicle is running, the destination coordinate data will automatically be erased from the memory. This prior art apparatus will however give rise to new shortcomings such that the destination coordinate data may not be erased even when the vehicle has arrived at the destination if the destination is a wide parking area, and that the destination coordinate data may be erased, stopping the display of the direction and distance, even when the vehicle has not yet arrived at the destination if the destination is a building-concentrated area.

SUMMARY OF THE INVENTION

It is therefore an object of the present invention to provide an on-vehicle navigation apparatus which properly erases destination coordinate data from a memory after a vehicle totally arrives at a destination, thus preventing display of navigation information from being stopped before the vehicle reaches the destination.

An on-vehicle navigation apparatus according to the present invention comprises detection means for detecting present-location coordinate data representing a present location of a vehicle, means for acquiring destination coordinate data representing destination in accordance with an operator input and storing the destination coordinate data in a memory, means for computing a distance from the present location to the destination on the basis of the present-location coordinate data and the destination coordinate data, discriminating means for discriminating whether or not the computed distance is equal to or smaller than a predetermined value, drive-area, source start detecting means for detecting start of a drive source of the vehicle and for generating a start detection signal, and means for erasing the destination coordinate data from the memory when the computed distance is judged to be equal to or smaller than the predetermined value upon generation of the start detection signal.

According to the thus designed on-vehicle navigation apparatus, destination coordinate data stored in the memory will be erased when the distance from the present location to a destination is equal to or smaller than a predetermined value at the time the vehicle's engine is started.

DETAILED DESCRIPTION OF THE PREFERRED EMBODIMENT

Figure 1:
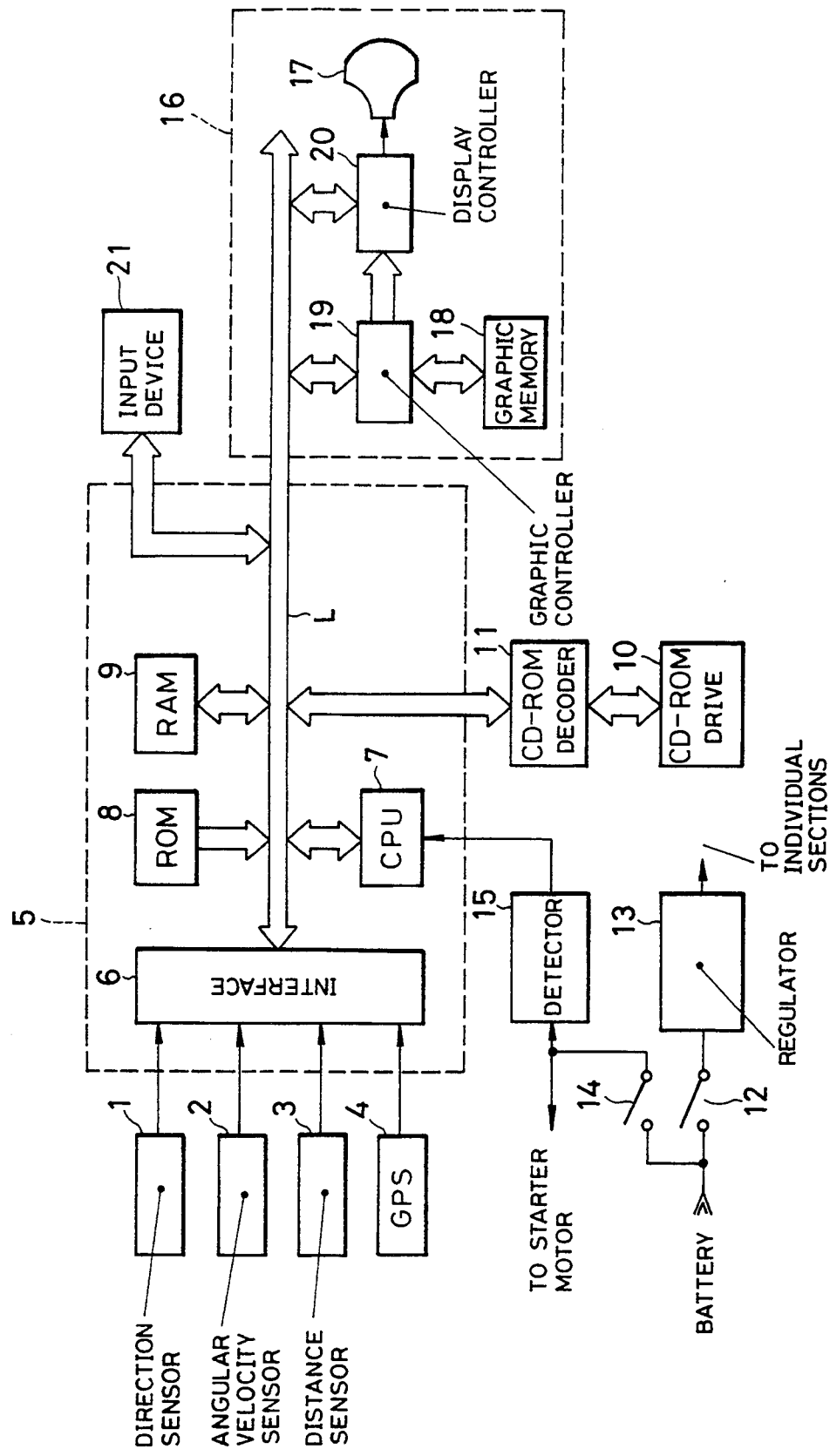
FIG. 1 is a block diagram illustrating an embodiment of the present invention.

FIG. 1 presents a block diagram of an on-vehicle navigation apparatus according to one embodiment of the present invention. In the on-vehicle navigation apparatus, a direction sensor 1 detects the running direction of a vehicle, an angular velocity sensor 2 detects an angular velocity of the vehicle, a distance sensor 3 detects the traveling distance of the vehicle, and a GPS (Global Positioning System) device 4 detects the absolute location of the vehicle on the basis of latitude and longitude information and the like. Detected outputs from these sensors and device are supplied to a system controller 5. Used as the direction sensor 1 is, for example, a geomagnetic sensor which detects the running direction of the vehicle by geomagnetism (i.e., with respect to the Earth's geomagnetic field). The distance sensor 3 comprises a pulse generator which generates a pulse every rotation of a predetermined angle of the drive shaft (not shown) of the vehicle. The pulse generator is of a known type which magnetically or optically detects the rotational angle and position of the drive shaft.

The system controller 5 comprises an interface 6, a CPU (Central Processing Unit) 7, a ROM (Read Only Memory) 8, and a RAM (Random Access Memory) 9. The interface 6 receives the detection outputs of the sensors 1 to 3 and GPS device 4 and performs processing such as A/D conversion. The CPU 7 computes the driving distance, direction, coordinates for present location (longitude and latitude), etc. of the vehicle on the basis of the data from the sensors 1 to 3 and GPS device 4 which are sequentially sent from the interface 6 as well as processes a variety of image data. In the ROM 8, various processing programs for the CPU 7 and other necessary information are previously stored. The RAM 9 is to be accessed so that information necessary for executing the programs will be written therein or read out therefrom. The RAM 9 is supplied with a voltage acquired by stabilizing the output voltage of a battery (not shown) even when the navigation apparatus is powered off, so that it may be backed up to prevent data such as destination coordinate data and a destination memory flag, which will be described later, from being erased.

For example, a CD-ROM is used as an external storage medium and is a nonvolatile read only storage medium. The external storage medium is not limited to a CD-ROM, but may be a different nonvolatile storage medium, such as a DAT or an IC card. Map data is acquired by digitization of individual points on roads of maps and is previously stored in the CD-ROM. The information in the CD-ROM is read out through a CD-ROM drive 10. The read information from the CD-ROM drive is decoded by a CD-ROM decoder 11 to be sent on a bus line L.

A source voltage from the battery through a so-called accessory switch 12 of the vehicle is regulated by a regulator 13 and supplied as a power source to the individual sections of the navigation apparatus. The voltage to be supplied to the RAM 9 does not come through the accessory switch 12 and is regulated by another regulator (not shown) different from the regulator 13.

There is also provided a detector 15 which detects the ON state of a starter switch 14 in order to detect the start of the engine of the vehicle. The detector 15 is connected to the output side of the starter switch 14, so that it may detect the level of a voltage supplied to a starter motor (not shown) when the starter switch 14 is turned on. In other words, when the level of the voltage supplied to the starter motor rises to or above a predetermined level, the detector 15 generates a start detection signal. The detection output of the detector 15 is coupled to the CPU 7.

The CPU 7 executes timer interruption to compute the running direction of the vehicle on the basis of the output data of the direction sensor 1 at a given cycle. The CPU 7 also acquires longitude data and latitude data as coordinate data of the present location of the vehicle from the covered distance and direction by the interruption every run of a predetermined distance based on the output data from the distance sensor 3. The CPU 7 collects the map data of an area of a certain range including the coordinates of the present location from the CD-ROM, and temporarily stores the data in the RAM 9 as well as supplies it to a display device 16.

The display device 16 comprises a display 17 such as a CRT, a graphic memory 18 constituted of a V (Video)-RAM or the like, a graphic controller 19, and a display controller 20. The graphic controller 19 writes the map data sent from the system controller 5 into the graphic memory 18 as image data and generates the data. The display controller 20 performs such control as displaying a map on the display 17 in accordance with the image data generated from the graphic controller 19. An input device 21 is constituted of a keyboard or the like and issues various commands and the like to the system controller 5 by the key operation of a user.

Figure 2:
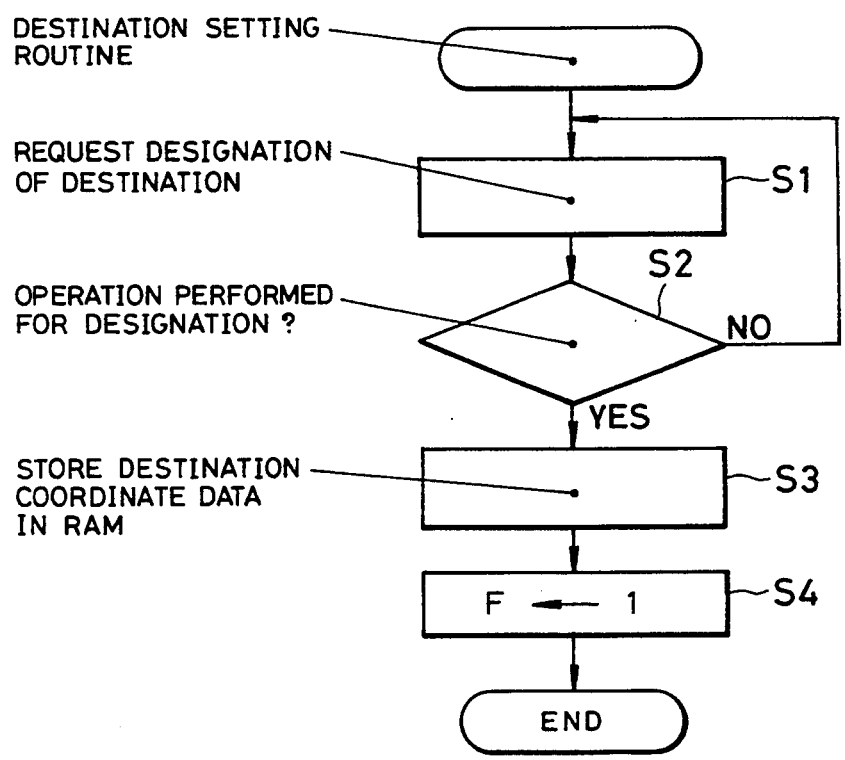
FIG. 2 is a flowchart illustrating a destination setting routine.

The destination coordinate data writing operation which is executed by the CPU 7 will be described in accordance with the destination setting routine illustrated as a flowchart in FIG. 2. The routine is accessed and executed when a setting menu is selected by the key operation of the user through the input device 21 during execution of the main routine (not shown), which includes processes, such that the present location of the vehicle is checked on the basis of individual output data of the sensors 1 and 3, a group of map data of an area of a certain range including the vehicle's present location is read out from the CD-ROM to display it as maps around this present location on the display 17, and a position indicator representing the vehicle's present location is displayed on the maps.

In the destination setting routine, the CPU 7 first requests the selection of destination setting (step S1). This request may be made by displaying a map on the display 17 together with a message informing the user of designation of the destination on the map with a cursor using the proper keys of the input device 21. The CPU 7 determines whether or not any designation has been made (step S2). If the destination has been designated, the CPU 7 obtains the longitude and latitude data of the designated point from map data, and stores the obtained data as destination coordinate data $(x0, y0)$ in the RAM 9 (step S3). The CPU 7 then sets a destination memory flag F to "1" (step S4), memorizing that the destination coordinate data has been set and written into the RAM 9.

In the destination setting routine, longitude and latitude data of each position is acquired from the map data recorded on the CD-ROM. The longitude and latitude data may however be input by the user through a certain key operation. Further, it is determined in step S2 whether designation has been made or not; however, this routine may be modified in such a way that upon detection of no designation, it is then determined if the input should be corrected so that when a request for the input correction is made, alteration of input data already designated can be allowed.

Figure 3:
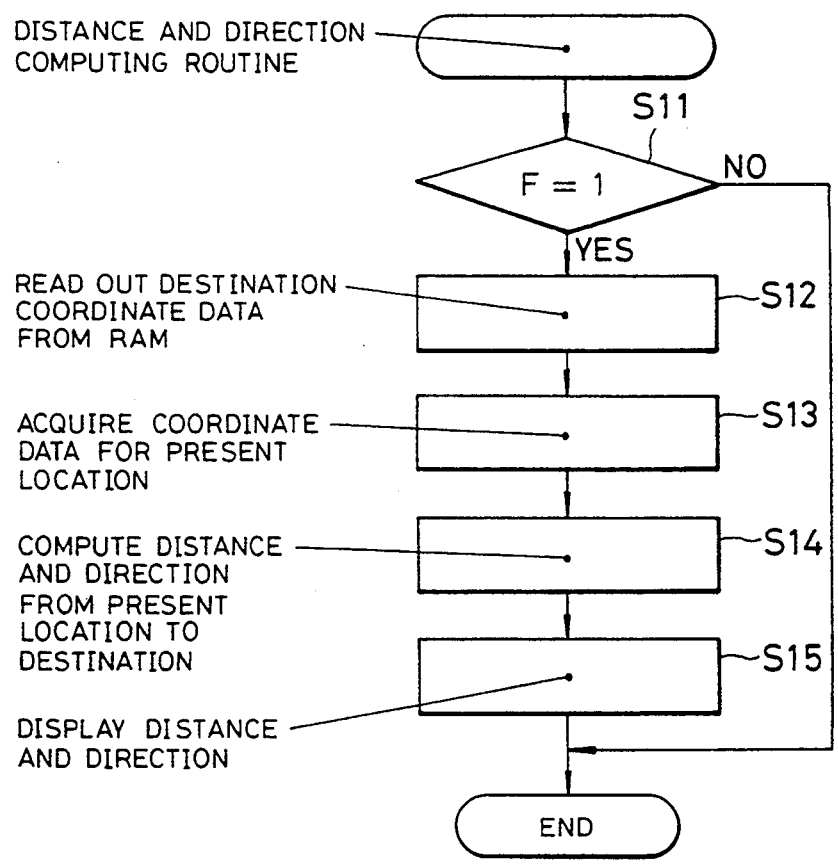
FIG. 3 is a flowchart illustrating a distance and direction computing routine.

The computing operation for the distance and direction from the present location to the destination, which is executed by the CPU 7 will be described in accordance with the distance and direction computing routine illustrated as a flowchart in FIG. 3. The routine is to be executed as a subroutine in the above-described main routine.

In the distance and direction computing routine, the CPU 7 first discriminates whether or not the destination memory flag F is "1" (step S11). When $F=0$, which means that the destination coordinate data has not been written in the RAM 9, the subroutine will be terminated immediately. When $F=1$, indicating that the destination coordinate data is written in the RAM 9, the CPU 7 reads out the destination coordinate data $(x0, y0)$ from the RAM 9 (step S12), and acquires present-location coordinate data consisting of longitude data and latitude data that represent the present location of the vehicle, on the basis of the output data of the sensors 1 and 3 (step S13). The present-location coordinate data may be obtained by, for example, a method disclosed in Japanese Provisional Patent Publication No. 63-115004. After execution of step S13, the CPU 7 calculates the distance and direction from the present location to the destination on the basis of the destination coordinate data and present-location coordinate data (step S14). The CPU 7 then supplies data representing the acquired distance and direction to the graphic controller 19 to display the distance and direction on the display 17 (step S15). The distance and direction between two points, such as the present location and destination, may be computed by, for example, a method disclosed in Japanese Provisional Patent Publication No. 60-282344.

Figure 4:
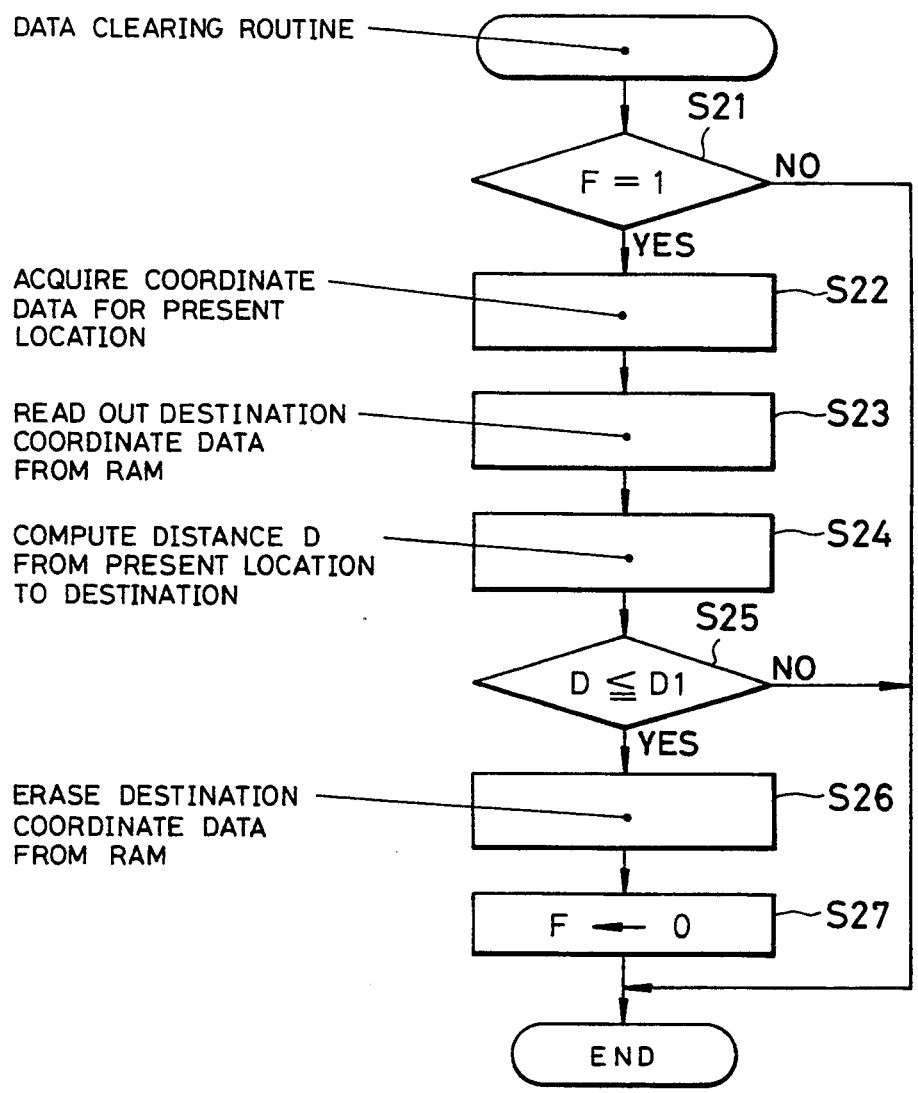
FIG. 4 is a flowchart illustrating a data clearing routine.

The destination coordinate data clearing operation is executed by the CPU 7 will be described in accordance with the data clear routine illustrated as a flowchart in FIG. 4. The routine is executed only when the CPU 7 receives the start detection signal from the detector 15. That is, when the starter switch 14 of the vehicle is turned on and the level of the voltage supplied to the starter motor rises to or above a predetermined level, the detector 15 generates the start detection signal. The data clear routine is started by the CPU 7 in response to the generation of the start detection signal.

Upon reception of the start detection signal, the CPU 7 first discriminates whether or not the destination memory flag F is "1" (step S21). When F=0, which means that the destination coordinate data has not been written in the RAM 9, this subroutine will be terminated immediately. When F=1, indicating that the destination coordinate data is written in the RAM 9, the CPU 7 acquires present-location coordinate data consisting of longitude data and latitude data that represent the present location of the vehicle, on the basis of the output data of the sensors 1 and 3 (step S22). The CPU 7 also reads out the latitude and longitude data of the destination, or the destination coordinate data from the RAM 9 (step S23), and computes the distance D from the present location to the destination on the basis of these present-location coordinate data and destination coordinate data (step S24). The CPU 7 then determines if the computed distance D is equal to or smaller than a predetermined value D1 (step S25). When D<D1, the CPU 7 erases the destination coordinate data from the RAM 9 because the vehicle has already arrived at the destination through the previous running (step S26). Then the CPU 7 resets the destination memory flag F to "0" (step S27) before terminating the routine. Unless the destination setting routine is executed to set a new destination, therefore, it is apparent from the flowchart of the distance and direction computing routine that the distance and direction from the present location to the destination will not be displayed. When D>D1, the CPU 7 will terminate this routine immediately to hold the destination coordinate data in the RAM 9 because the vehicle has not arrived at the destination yet in the previous running. After termination of the data clear routine, the CPU 7 starts executing the main routine.

When the distance D from the present location to the destination is equal to or smaller than the predetermined value D1 at the time the vehicle's engine is started, therefore, it is considered that the engine has been shut off as the vehicle has arrived at the destination, and that the present start of the engine is for driving toward a new destination, and the destination coordinate data stored in the memory will be erased. Since it is very likely that the engine is temporarily shut off when the vehicle arrives at a destination, there will not be any problem to set the predetermined value D1 sufficiently larger than the threshold value needed to determine whether the vehicle has arrived at the destination during actual driving.

The start of the engine of a vehicle is not only determined from the level of the voltage supplied to the starter motor, but may also be detected from, for instance, engine parameters such as the number of revolutions of the engine, the temperature of the engine coolant and the amount of the intake air.

The type of a vehicle on which the present apparatus is installed is not limited to an engine-driven type as in the above-described embodiment, but the present invention can also apply to a motor-driven type vehicle.

According to the on-vehicle navigation apparatus embodying the present invention, when the distance from the present location to a destination is equal to or smaller than a predetermined value at the time the drive source of a vehicle is started, destination coordinate data stored in the memory will be erased. The destination coordinate data will not therefore be erased while the vehicle is actually running toward the destination. Thus, the display of navigation information such as the direction and distance is not erased before the vehicle arrives at the destination. As the predetermined value can be set relatively large, the destination coordinate data can surely be erased from the memory even when the destination is a wide parking area. Further, even when the engine has been temporarily shut off as the vehicle has arrived at the destination, and the engine is started again to drive toward a new destination, it is possible to prevent the navigation information for the previous destination from being displayed.

What is claimed is:

1. An on-vehicle navigation apparatus for displaying navigation information from a present location of a vehicle to a destination, comprising:

detection means for detecting present-location coordinate data representing the present location of said vehicle;

means for acquiring destination coordinate data representing said destination in accordance with an operator input and storing said destination coordinate data in a memory;

means for computing a distance from said present location to said destination on the basis of said present-location coordinate data and said destination coordinate data;

discriminating means for discriminating whether the computed distance is greater than a predetermined value;

drive-source start detecting means for detecting start of a drive source of said vehicle and for generating a start detection signal;

means for erasing said destination coordinate data from said memory when said computed distance is judged to be not greater than said predetermined value upon generation of said start detection signal; and display means for displaying at least one of said present location coordinate data and said destination coordinate data.

2. An on-vehicle navigation apparatus according to claim 1, wherein said drive-source start detecting means generates the start detection signal in accordance with a level of a voltage to be supplied to a starter motor when said drive source of said vehicle is an engine.

3. An on-vehicle navigation apparatus according to claim 1, wherein said drive-source start detecting means generates the start detection signal in accordance with a number of revolutions per minute of an engine, said engine being said drive source of said vehicle.

4. An on-vehicle navigation apparatus according to claim 1, wherein said drive-source start detecting means generates the start detection signal in accordance with a coolant temperature of an engine, said engine being said drive source of said vehicle.

5. An on-vehicle navigation apparatus according to claim 1, wherein said drive-source start detecting means generates the start detection signal in accordance with an amount of air intake of an engine, said engine being said drive source of said vehicle.

* * * * *